United States Patent [19]

Rosser et al.

[11] 4,410,682

[45] Oct. 18, 1983

[54] FLUOROETHER MODIFIED EPOXY COMPOSITES

[75] Inventors: Robert W. Rosser, San Jose; Mark S. Taylor, Palo Alto, both of Calif.

[73] Assignee: The United States of America as represented by the Administrator of the National Aeronautics and Space Administration, Washington, D.C.

[21] Appl. No.: 452,464

[22] Filed: Dec. 23, 1982

[51] Int. Cl.$^3$ ............... C08G 59/18; C08G 59/30; C08K 5/06

[52] U.S. Cl. ................... 528/110; 523/435; 523/456; 528/361

[58] Field of Search ............... 523/456, 435; 528/110, 528/361

[56] References Cited

U.S. PATENT DOCUMENTS

| | | | |
|---|---|---|---|
| 2,833,681 | 5/1958 | Nelson et al. | 528/365 |
| 3,879,490 | 4/1975 | Villa | 528/288 |
| 4,007,079 | 2/1977 | Turley et al. | 528/110 |
| 4,145,524 | 3/1979 | Ross et al. | 528/422 |

*Primary Examiner*—Ronald W. Griffin
*Attorney, Agent, or Firm*—Darrell G. Brekke; John R. Manning

[57] ABSTRACT

Addition of controlled amounts of perfluorinated alkyl ether diacyl fluoride to epoxy resin systems prior to cure results in a formulation which, when cured with or without reinforcing, exhibits improved energy absorbing properties.

14 Claims, No Drawings

FLUOROETHER MODIFIED EPOXY COMPOSITES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

The invention is in the field of reinforced epoxy composites and epoxy resin systems for their production. More particularly, this invention concerns a modification of epoxy resin systems which enhances the energy absorbing properties of composites prepared from them.

BACKGROUND

Fiber reinforced epoxy composites have found widespread utility as structural materials. They have the advantage of having both high strength and high modulus to weight ratios, making them particularly useful in aeronautical and aerospace applications. A major drawback to these high modulus materials is their inherent brittleness which reslts in low impact strength.

It has been recognized that epoxy material can be modified by incorporating various reactive or inert material into their cure mixture and that by these modifications, the properties of the cured product can be varied. For example, U.S. Pat. No. 4,007,079 issued on Feb. 8, 1977 to Turely et al. shows that adding certain chlorine-containing polyols to an epoxy resin can reduce the resin's flamability. U.S. Pat. No. 2,833,681 issued on May 6, 1958 to Nelson et al. shows that using a fluorine-containing polycarboxylic anhydride as the cure agent in epoxy systems gives improved high temperature stability and properties. U.S. Pat. No. 3,879,490 issued Apr. 22, 1975 to Villa shows that an epoxy system is rendered inherently mold-releasable when it contains a reaction product of a hydroxyl or carboxyl-terminated polymer containing pendant vinyl or alkyl groups with perfluoroalkyl iodides. This compounding is also reflected in the toughening of epoxies by adding various rubber-like materials, most commonly carboxyl-terminated butadiene-acrylonitrile copolymers. This is discussed at Riew, C.K. et al. "Rubber Toughened Thermosets" in *ACS Advances in Chemistry Series—Toughness and Bitterness of Plastics*, Vol 27, p 330 which further describes a loss of modulus (stiffness) and a drop in ultimate use temperature.

Enhancement of the energy absorbing properties of thermoplastic and thermosetting resin systems such as the epoxies by adding rubber-like materials is recognized to depend upon the degree of rubber-resin compatability and upon the extent of dispersion of the rubber phase and control of its particle size. Bragaw, C. G., "The Theory of Rubber Toughening of Brittle Polymers," *ACS Advances in Chemistry Series, "Multicomponent Polymer Systems"*, Vol. 176, points out at page 100 that in order to obtain a discrete rubber phase there must be a degree of incompatability between rubber and resin. This same article teaches at page 91 that, to insure efficient energy transfer, there must be molecular interaction between the two phases. The present invention serves to improve epoxy resin toughness without compromising the epoxy's high modulus, high strength and good thermal stability.

STATEMENT OF THE INVENTION

An improved modified epoxy resin system has now been found. The new resin system comprises a curable liquid epoxy resin, a curing agent and a perfluorinated alkyl ether diacyl fluoride. In other aspects, this invention provides cured epoxy bodies and fiber-reinforced cured epoxy composites made from such a resin system.

DESCRIPTION OF THE PREFERRED EMBODIMENTS

The epoxy compositions of the invention include an epoxy resin, a curing agent for said resin and a perfluorinated alkyl ether diacyl fluoride. The epoxy resin employed may be selected from the liquid curable epoxy resins taught in the art. See, for example, the resins described in H. Lee and K. Neville, *Handbook of Epoxy Resins*, McGraw Hill Inc., New York (1967) which text is incorporated herein by reference. This text also shows how to make these resins. These resins may be further characterized as having a plurality of (i.e. more than one) of $\alpha$ epoxy groups in their molecule. The epoxy groups may be located throughout the resin molecule.

Examples of epoxy resins include

A. Linear expoxies such as the epoxidized polybutadienes. Representatives of these materials are sold under the designations "Oxiron", i.e. "Oxiron 2000", "Oxiron 2001" and "Oxiron 2002";

B. Cycloaliphatic types including epoxy ethyl-3,4 epoxy-6-methyl cyclohexylmethyl-3,4-epoxy-6-methylcyclohexanecarboxylate "Unox 201";

C. Resorcinol diglycidal ether types as exemplified by the "Kopoxite" resins;

D. The Ciba-Geigy epoxy resins such as exemplified by MV-720 and the like;

E. The epoxy novalak type exemplified by "Dow Epoxy Novalak 438", "DEN 438-EK 85", "KER 357A" and "KER 955 A"; and F. The glycidyl phenol type which includes the glycidyl ethers of bisphenols such as bisphenol A, the glycidyl ethers of mononuclear di- and trihydric phenols and the like. These materials are preferred and include the materials sold as "Epon" resins, e.g. "Epon 828", "Epon 820", "EPON 815"; the "Epi-Rez" resins, e.g. "Epi-Rez 510"; "Bakelite ERC" and "Tipox A, B, and C". The glycidyl ethers of bisphenol A are especially preferred. These materials are shown structurally as

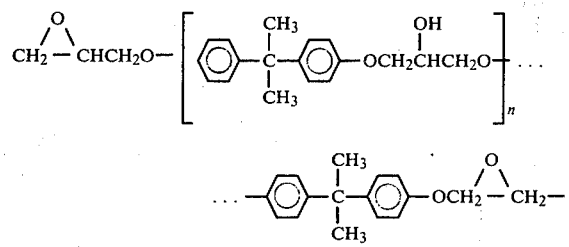

wherein n is 0 or 1.

The epoxy resin curing agent or catalyst employed in the compositions of this invention generally includes any material known in the prior art to be an effective curing agent for a particular epoxy resin as defined herein or for any generic group of epoxy resins. This may include two or more ingredients which act together as a curing system for the epoxy resin. The curing agent, when mixed with the epoxy resin, serves to transform it from the liquid or thermoplastic state to a hard thermoset solid; and depending on the nature of the particular curing agent, this transformation occurs by the curing agent acting as a catalyst to promote the curing process, or the curing agent may participate in a reaction with the epoxy resin thereby becoming chemically bound into the resin chain.

Illustrative epoxy resin curing agents include basic materials, such as the Lewis bases, the inorganic bases, the primary and secondary amines, and the amides, and acidic materials such as the Lewis acids, phenols such as methylaminophenol, the carboxylic acid anhydrides e.g. succinic anhydride or Nadic anhydride, and the diabasic organic acids. These and other curing agents are described in detail in the above-cited *Handbook of Epoxy Resins* which is incorporated herein by reference.

The curing agent is employed in any suitable proportion which is effective in curing the epoxy resin. As is well known in the art, such proportion varies considerably depending on the chemical nature of the curing agent. The rate of curing which is applicable in the case of one curing agent may represent an insufficient or excessive level, as the case may be, when a different curing agent is used. Thus, the term "effect amount", as used in the specification and claims herein with reference to the curing agent is intended to encompass any such proportion of a particular curing agent or group of curing agents which may suitably be used to bring about curing of the epoxy resin. For general illustration, depending on the particular material used, the curing agent may be employed in a proportion from about 4 to about 100 parts by weight per 100 parts of the epoxy resin.

The compositions of the invention additionally comprise a perfluorinated alkyl ether diacyl fluoride. Such materials have the structure

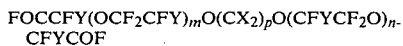
FOCCFY(OCF$_2$CFY)$_m$O(CX$_2$)$_p$O(CFYCF$_2$O)$_n$-CFYCOF wherein Y is fluorine or trifluoromethyl, X is hydrogen or fluorine, p is a number that ranges from about 1 to about 18 inclusive and m and n are each numbers from 1 to 6 inclusive, the sum of which is from 2 to 12 inclusive. Preferably, X is fluorine, p is a number from 2 to 12 inclusive and the sum of m plus n is from 4 to 7 inclusive. More preferably, Y is CF$_3$, q is about 5 and the sum of m plus n is from 4 to 6 inclusive. Representatives of these materials are available commercially such as from PCR Research Chemicals, Inc. and are also described with their preparation in U.S. Pat. No. 4,145,524 which is incorporated herein by reference The proportion of perfluorinated alkyl ether diacyl fluoride (EDAF) to the epoxy should be controlled. While relatively large amounts such as 20% by weight (basis total resin composition) can be incorporated, these large amounts tend to adversely effect the properties of the cured products. In general terms additions of from 1% to 15% on the basis are preferred. Additions of 2 to 4% by weight of EDAF give maximum improvements in tensile strength, while a somewhat wider range of EDAF additives, such as from 2 to 12% by weight, give maximum increase in dynamic properties of the reinforced composites such as their flexural strength, flexural modulus and flexural toughness.

In addition to the three aforesaid components, other ingredients may be added to the epoxy resin system. These other ingredients may include fillers, diluents, mold release agents, plasticizers and the like. It must be kept in mind, however, that the underlying composition is designed for high performance applications and that any added ingredients should be chosen carefully so as to not interfere with these desired properties.

The resin systems of this invention can be employed with reinforcing filaments and cloth fibers such as are known in the art. These include, for example, glass fibers, carbon fibers, boron fibers, aramid fibers such as the material marketed as Kevalar ® and the like and cloths made therefrom. Conventional ratios of fiber to resin may be employed.

EXAMPLE

A. Resin System Formulation

A resin formulation was made up using a diglycidyl ether of bisphenol A (DGEBA) marketed by Shell Chemical Company as EPON 828 (189 g/equivalent as determined by the pyridinium chloride method); 4,4'-diaminodiphenyl sulfone (DDS) marketed by Ciba-Geigy Corporation (124 g/equivalent) and a liquid perfluorinated alkyl ether diacyl fluoride of the structure

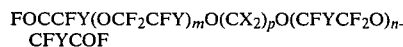
FOCCFY(OCF$_2$CFY)$_m$O(CX$_2$)$_p$O(CFYCF$_2$O)$_n$-CFYCOF wherein Y is trifluromethyl, X is fluorine, p is 5 and the sum of n+m is 5 to 6 (EDAF) marketed by PCR Research Chemicals, Inc. (725 g/equivalent).

EPON 828 was dissolved in enough acetone to obtain 50% solids in the final mixture. EDAF was then added and stirred for 15 minutes to pre-react with the epoxy. DDS was added and stirred until the solution became transparent. Stoichiometry was determined by starting with a control batch having 77% EPON 828 and 23% DDS by weight and adding varying amounts of EDAF by weight (e.g. 3, 5, 7, 8, 9, 10 and 20%) to make a series of test formulations. To maintain the reactive stoichiometry constant from sample to sample, equal equivalences of DDS were subtracted from the control formulation.

B. Sample Preparation

A series of cured samples were prepared to deterine their properties. These samples were both neat resin samples and fiber glass-resin composites.

Neat resin samples were prepared by taking the above formulations and pouring them into a high temperature RTV silicone dogbone mold. Using vacuum and heat the solvent was carefully removed before gelation. The temperature was raised gradually to 150° C. for 1.5 hours to effect curing.

The fiber glass/resin composites were prepared by painting 12, 12 inch by 10 inch satin weave glass fiber sheets purchased from Uniglass Industries, style 01-01-7781, finish UM655 (an A-1100 amino silane sizing). Prepregs were made by staging at 80° C. for 5 minutes and 120° C. for variable times depending on EDAF content. After lay-up, pressing was done at 150° C. and 50 psi for 1.5 hours to achieve cure. The laminates were cooled at room temperature to avoid warping. The time to achieve cure was determined previously by infrared spectroscopy wherein each of the formulations was painted onto NaCl plates, and heated. The progress of the cure was observed by the disappearance of epoxy bands at 915 cm$^{-1}$ and 859 cm$^{-1}$, primary amine bands at 3410 cm$^{-1}$ and 3368 cm$^{-1}$, and the acyl fluoride band of EDAF at 1885 cm$^{-1}$. The reaction of epoxy and EDAF resulted in an ester linkage as demonstrated in the appearance of a carbonyl band at 1775 cm$^{-1}$.

C. Testing of the Cured Neat Resin samples and Cured Laminated samples.

The curing characteristics of the neat resin systems were studied with a DuPont 901 Cell Base/990 Differential Scanning Calorimeter. Thermogravimetric analysis of these samples was carried out using a DuPont 951/990 Thermal Analyzer.

The neat resin dogbones were tensile tested according to ASTM designation D638-68, "Standard Method of Test for the Tensile Properties of Plastics."

Test samples were cut from the fiber/epoxy laminates for dynamic mechanical analysis, 3 point flexural, tensile and short beam shear tests. Dynamic mechanical analysis was done on a DuPont 980 DMA, interfaced with a Digital MINC II instrument computer. The flexural, tensil and short beam shear tests were made with an INSTRON mechanical tester according to ASTM procedures D790-70, D638-68 and D2344-76 respectively. The short beam shear samples were impacted with a Gardner type ball impactor. Each value was determined as the average of at least 6 samples. Neat resin samples were tested for flexural tensile strength by ASTM procedure D790-70, as well.

A control and an EDAF modified dogbone sample were immersed in boiling water for 5 weeks and weighed at intervals to determine water resistance.

The test on the neat resin samples produced the data set out in Table I. These data reveal that the addition of EDAF only slightly lowers the thermal stability while raising the position of the dampening peak in the temperature domain. The tensile properties improve dramatically at 3.0% EDAF over that of the control and then drop off at higher concentrations. There appears to be excellent tensile reinforcement at the 2 to 4% EDAF level.

TABLE I

| Sample (% EDAF) | Neat Resin Properties | | | |
|---|---|---|---|---|
| | TGA 5% wt. loss (°C.) | DMA Tg (°C.) | Tensile Strength (psi × 10³) | Tensile Modulus (psi × 10⁵) |
| 0 | 395 | 160 | 13.9 | 2.01 |
| 3 | 385 | 168 | 23.3 | 3.52 |
| 5 | 385 | 173 | 11.6 | 1.98 |
| 8 | 380 | 178 | 11.4 | 1.87 |

The comparison of water pick-up between the control and the EDAF-modified material produced the results given in Table II and showed that the modified material picked up 39% less water than did the control. This is advantageous in minimizing unwanted weight gain in devices fabricated from the composites.

TABLE II

| Cumulative Time, days | Water Pick up, % by Weight | |
|---|---|---|
| | Control | Modified Material |
| 0 | 0 | 0 |
| 1 | 1.2 | 1.5 |
| 2 | 1.7 | 1.9 |
| 3 | 2.0 | 2.2 |
| 4 | 2.4 | 2.3 |
| 5 | 2.8 | 2.3 |
| 8 | 3.6 | 2.5 |
| 10 | 3.9 | 2.5 |
| 14 | 4.1 | 2.5 |
| 21 | 4.2 | 2.6 |
| 35 | 4.2 | 2.6 |

The tests on the fiber reinforced resin samples produced the data set out in Table III.

TABLE III

| | Glass Cloth Composite Properties | | | | | | |
|---|---|---|---|---|---|---|---|
| Sample (% EDAF) | Flexural Strength (psi × 10⁴) | Flexural Modulus (psi × 10⁶) | Flexural Toughness (ft.lbs/in³) | Tensile Strength (psi × 10⁴) | Tensile Modulus (psi × 10⁶) | Tensile Toughness (ft.lbs/in³) | DMA Tg (°C.) |
| 0 | 5.78 | 0.10 | 36.5 | 4.46 | 2.26 | 77 | 203 |
| 3 | 8.04 | 3.72 | 51.8 | 5.65 | 2.63 | 103 | 216 |
| 5 | 9.02 | 4.36 | 52.4 | 5.07 | 2.57 | 83 | 212 |
| 8 | 9.55 | 4.32 | 60.4 | 4.85 | 2.31 | 76 | 225 |
| 10 | 7.06 | 3.27 | 41.0 | 4.07 | 2.14 | 62 | 206 |
| 20 | 2.75 | 1.98 | 11.5 | 2.20 | 1.92 | 19 | 190 |

These data show that the tensile strength and modulus of these materials is optimized at the levels of EDAF addition which also worked best on the neat materials—that is, from 2 to 4% EDAF addition. The flexural properties were most improved at 2 to 10% EDAF additions and dropped off at higher EDAF addition levels.

Table IV lists the impact resistance data of the modified laminates and the control. These data demonstrate that the flexural toughness and short beam shear properties after impact are improved when 2 to 10% EDAF is added without significantly compromising strength and modulus.

TABLE IV

| | Short Beam Shear - Impact Properties Short Beam Shear Strength (psi) | | |
|---|---|---|---|
| Sample (% EDAF) | No Impact | 5 in · lbs Impact | % Loss |
| 0 | 10,300 | 8,800 | 15 |
| 3 | 9,800 | 9,600 | 2 |
| 7 | 9,400 | 9,300 | 1 |
| 8 | 9,400 | 8,900 | 5 |
| 9 | 10,400 | 10,200 | 2 |
| 10 | 10,600 | 10,600 | 0 |

Illustrative Embodiments

Using the resin formulating and cure techniques of the Example but varying the feedstocks the following materials could be prepared.

A. Resin Formulations of Example on aramid filaments.

B. Resin Formulations of Example on carbon filaments.

C. Resin Formulations of Example on boron filaments.

|   |   |   |
|---|---|---|
| D. | DGEBA | 60 parts by weight |
|    | DDS   | 35 parts by weight |
|    | EDAF of Example | 5 parts. |

E. Material of D applied to boron filaments, fiber glass, aramid fibers and the like.

|   |   |   |
|---|---|---|
| F. | DGEBA | 77 parts |
|    | DDS   | 23 parts |
|    | EDAF wherein p is 7 and n + m is 4. | 1 to 10% of the total formulation weight |

G. The materials of F, applied to fiber glass, aramid filaments, boron filaments and carbon filaments.

|   |   |   |
|---|---|---|
| H. | DGEBA | 77 parts |
|    | DDS   | 23 parts |
|    | EDAF wherein p is 2 and n + m is 8. | 1 to 10% of the total formulation weight |

I. The materials of H applied to fiber glass, aramid filaments, boron filaments and carbon filaments.

J. Materials of the Example, of A, of B, of C, of F, of G, of H, and of I modified by replacing serially DGEBA with Ciba-Geigy MV-720; Shell Epon 815, and Dow Epoxy-Novalac. In a second set of repeats, DDS is replaced with DMP-30 type methylaminophenol, anyhdrides such as succinic anhydride and Nadic anhydride. Similar results are obtained.

The foregoing Example and Illustrative Embodiments are provided to exemplify the practice of the invention. They are not to be construed as limiting the scope of the invention which is as defined by the following claims.

We claim:
1. A curable liquid epoxy formulation comprising
   (a) an epoxy resin,
   (b) a curing agent for said epoxy resin, and
   (c) a perfluorinated alkyl ether diacyl fluoride.
2. The curable liquid epoxy formulation of claim 1 wherein said perfluorinated alkyl ether diacyl fluoride has the structural formula

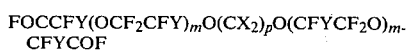

wherein Y is fluorine or trifluoromethyl, X is hydrogen or fluorine, p is a number that ranges from about 1 to about 18 inclusive and m and n are each numbers from 1 to 6 inclusive, the sum of which is from 2 to 12 inclusive.

3. The curable liquid epoxy formulation of claim 2 wherein said acyl fluoride is from 1 to 15% by weight of the formulation.

4. The curable liquid epoxy formulation of claim 3 wherein the epoxy resin is a glycidyl ether of a bisphenol.

5. The curable liquid epoxy formulation of claim 3 wherein the epoxy resin is a glycidyl ether of bisphenol A.

6. The curable liquid epoxy formulation of claim 3 wherein X is fluorine, q is a number from 2 to 12 inclusive and the sum of m plus n is from 4 to 7 inclusive.

7. The curable liquid epoxy formulation of claim 6 wherein the epoxy resin is glycidyl ether of bisphenol A.

8. A curable liquid epoxy formulation comprising a diglycidyl ether of bisphenol A, an effective curing amount of 4,4'-diaminodiphenyl sulfone and from 1 to 15% by weight, basis formulation, of a perfluorinated alkyl ether diacyl fluoride of the formula

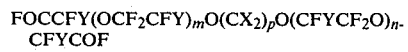

wherein X is fluorine, Y is $CF_3$, p is about 5 and m+n is from 4 to 6.

9. A formulation of claim 1 when polymerized into a solid insoluble resinous composition.

10. A formulation of claim 8 when polymerized into a solid insoluble resinous composition.

11. A reinforced resinous composition comprising a fibrous reinforcing medium within a solid insoluble composition resulting from curing of a formulation of claim 1.

12. The reinforced resinous composition of claim 11 wherein the fibrous reinforcing medium is fiberglass.

13. A reinforced resinous composition comprising a fibrous reinforcing medium within a solid insoluble composition resulting from curing of a formulation of claim 8.

14. The reinforced resinous composition of claim 13 wherein the fibrous reinforcing medium is fiberglass.

* * * * *